(12) United States Patent
Yoshida et al.

(10) Patent No.: US 6,480,362 B1
(45) Date of Patent: Nov. 12, 2002

(54) FLEX CABLE, HEAD SUSPENSION ASSEMBLY, AND HARD DISK DRIVE

(75) Inventors: Keiichiroh Yoshida, Fujisawa; Naoaki Kanada, Sagamihara; Jun Ishikawa, Yokohama; Hitoshi Tsujino, Fujisawa, all of (JP)

(73) Assignee: International Business Machines Corporation, Armonk, NY (US)

( * ) Notice: Subject to any disclaimer, the term of this patent is extended or adjusted under 35 U.S.C. 154(b) by 36 days.

(21) Appl. No.: 09/587,484

(22) Filed: Jun. 5, 2000

(30) Foreign Application Priority Data

Jun. 29, 1999 (JP) .............................. 11-182940

(51) Int. Cl.[7] .......................... G11B 21/08; G11B 5/55; G11B 21/16; G11B 5/48
(52) U.S. Cl. .................. 360/264.2; 360/245.9
(58) Field of Search ................... 360/264.2, 264.1, 360/264, 260, 240, 266.3, 245.2, 245.8, 245.9, 244.5

(56) References Cited

U.S. PATENT DOCUMENTS

| 5,798,885 A | * | 8/1998 | Saiki et al. | 360/77.08 |
| 5,818,667 A | * | 10/1998 | Larson | 360/264.2 |
| 5,907,452 A | * | 5/1999 | Kan | 360/97.01 |
| 5,923,501 A | * | 7/1999 | Suzuki et al. | 360/264.2 |
| 5,953,183 A | * | 9/1999 | Butler et al. | 360/264.2 |

* cited by examiner

Primary Examiner—Robert S. Tupper
Assistant Examiner—Julie Anne Watko
(74) Attorney, Agent, or Firm—Robert B. Martin; Bracewell & Patterson, L.L.P.

(57) ABSTRACT

A flexible cable assembly (FCA) has a flexible cable, first and second brackets attached to the flexible cable, and a band for holding the first and second brackets while the flexible cable is folded back and the first and second brackets overlap. The band is detachably mounted to the first and second brackets to facilitate efficient manufacturing and disassembly methods. The FCA may be implemented at various manufacturing stages including the head suspension assembly (HSA) or the entire hard disk drive (HDD) assembly.

15 Claims, 13 Drawing Sheets

Fig. 8 — Position at which the flexible cable 60 is folded

Fig. 10A        Fig. 10B

Assumed hooked position

FLEX CABLE, HEAD SUSPENSION ASSEMBLY, AND HARD DISK DRIVE

1. Technical Field

The present invention relates generally to the internal structure of a hard disk drive (HDD), and a method of manufacturing and disassembling the HDD. More particularly, the present invention relates to a method of properly supporting an HDD flexible cable.

2. Description of the Related Art

In prior art, there is no structure that can properly support a flexible cable that has been folded back while facilitating attachment and detachment in a hard disk drive (HDD).

SUMMARY OF THE INVENTION

A flexible cable assembly (FCA) has a flexible cable, first and second brackets attached to the flexible cable, and a band for holding the first and second brackets while the flexible cable is folded back and the first and second brackets overlap. The band is detachably mounted to the first and second brackets to facilitate efficient manufacturing and disassembly methods. The FCA may be implemented at various manufacturing stages including the head suspension assembly (HSA) or the entire hard disk drive (HDD) assembly.

BRIEF DESCRIPTION OF THE DRAWINGS

FIG. 2, which includes a plan view (FIG. 2A) and several perspective views (FIGS. 2B to 2E), illustrates a head suspension assembly (HSA);

FIG. 12, which includes a perspective view (FIG. 12A) and a plan view (FIG. 12B), illustrates the need to attach flex cable assembly (FCA) 50 to head gimbal assembly (HGA) 32 with attaching screw 44 before folding back the flexible cable 60;

DETAILED DESCRIPTION OF THE PREFERRED EMBODIMENT

Figure 1:
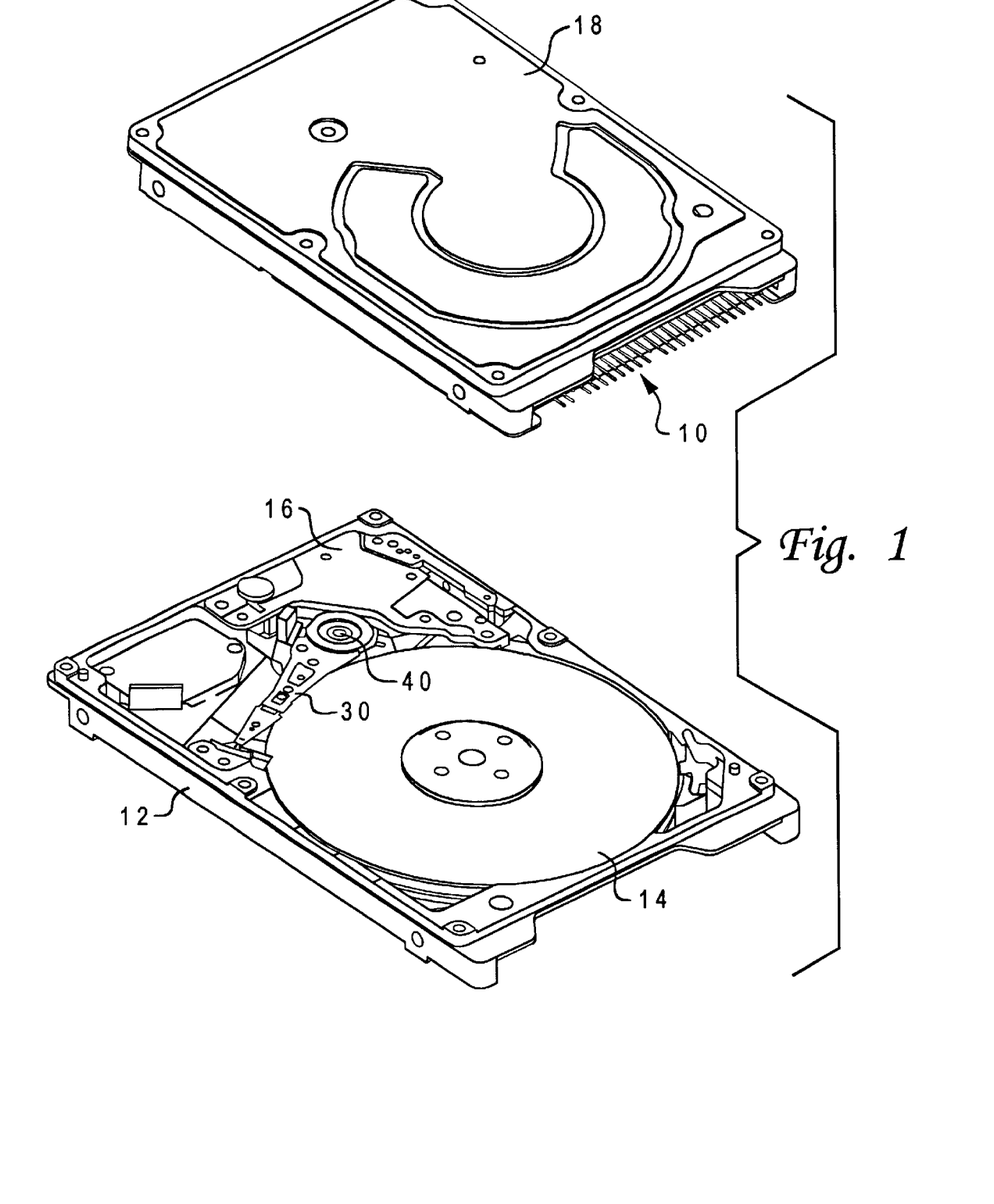
FIG. 1 is a perspective view of a hard disk drive (HDD)

FIG. 1 is a perspective view of a hard disk drive (HDD) 10 with a cover 18 removed to show its internal state. A disk 14 is attached to a base 12 so that it is rotatable. Also, a head suspension assembly (HSA) 30 is attached to the base 12 so that it can have access to a predetermined position on the disk 14 in the radial direction of the disk 14.

Figure 2A:
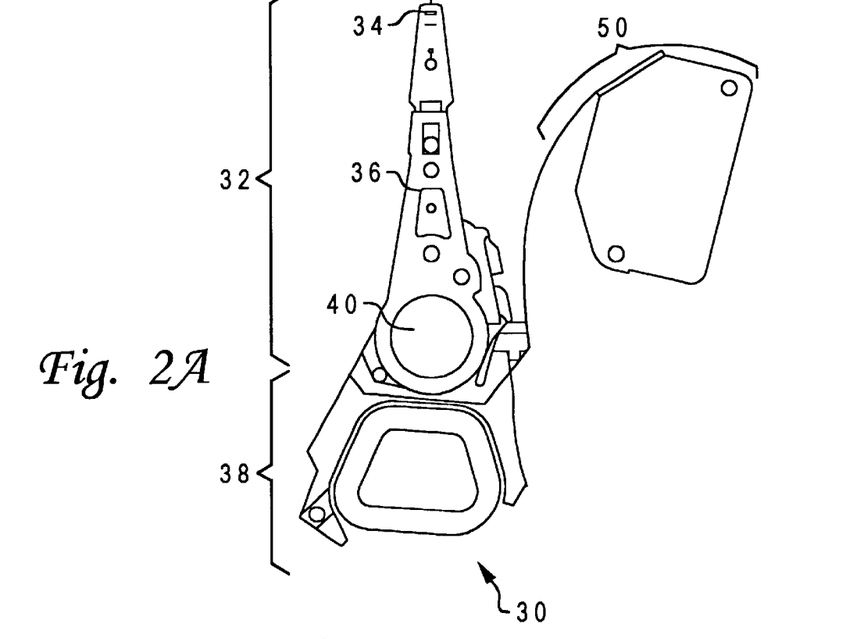
Figures 2B, 2C:
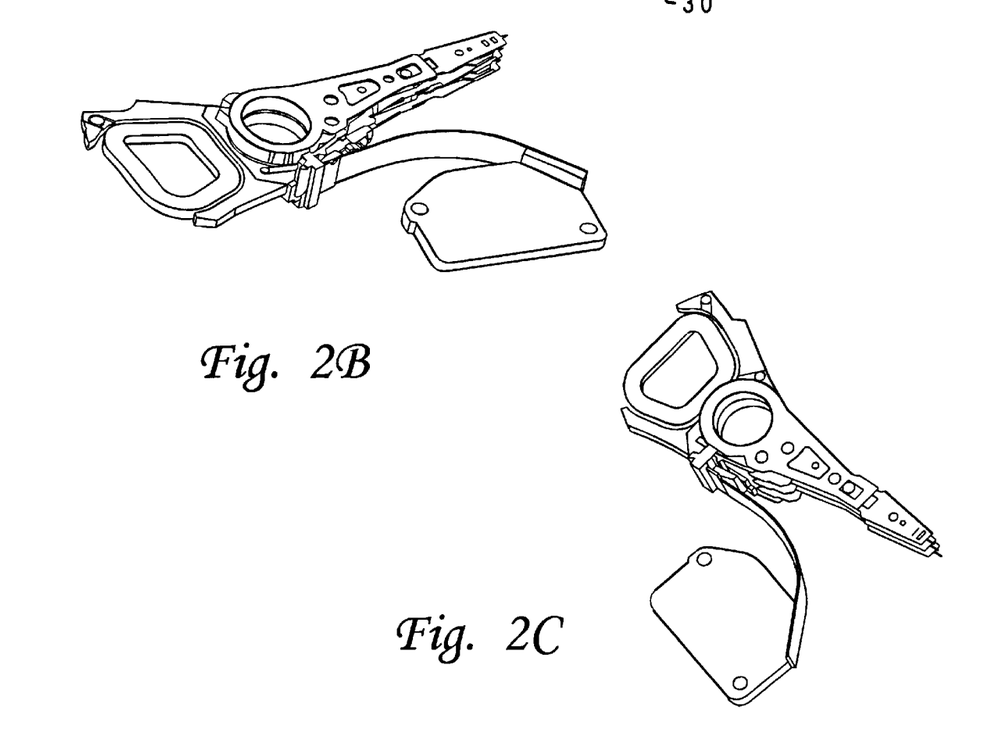
Figures 2D, 2E:
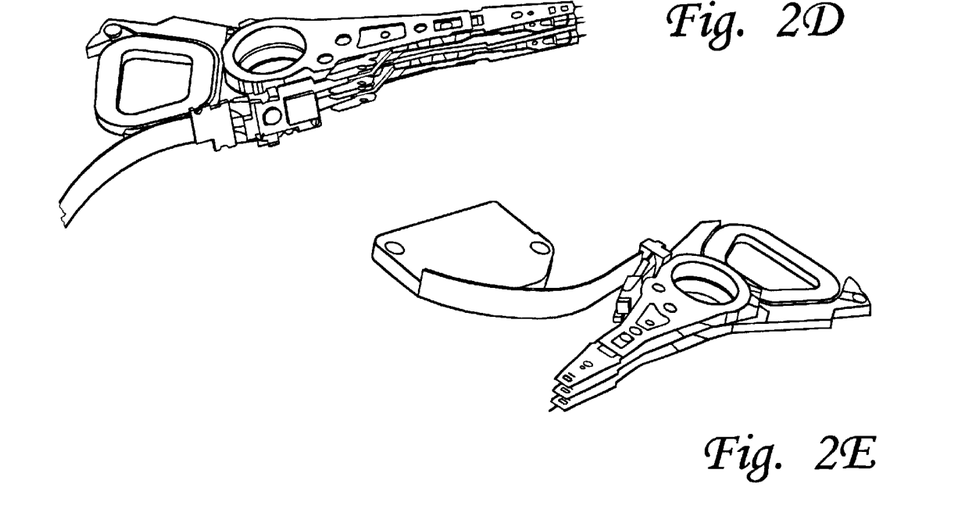

FIGS. 2A E shows a plan view (FIG. 2A) and perspective views (FIGS. 2B to 2E) of the head suspension assembly (HSA) 30. The perspective views are taken in various directions. The head suspension assembly (HSA) 30 includes a head gimbal assembly (HGA) 32, a coil support 38, and a flex cable assembly (FCA) 50.

The head gimbal assembly (HGA) 32 and the coil support 38 are fixedly attached with each other, they being mounted on the base 12 so that they are rotatable on a shaft 40 (also see FIG. 1). Current is applied to the coil portion of the coil support 38 through the flex cable assembly (FCA) 50. The coil support 38 rotates the head suspension assembly (HSA) 30 in cooperation with a magnetic field given by a voice coil motor (VCM) assembly 16 (FIG. 1). With this rotation, the head suspension assembly (HSA) 30 can have access to a desired position on the disk 14.

With respect to recording data on the disk 14 and reading data from the disk 14, a signal is given to a head 34 positioned on the pointed end of a suspension 36 and a signal is taken from the head 34. The data recording and reading signals are also transmitted through the flex cable assembly (FCA) 50.

Figure 3:
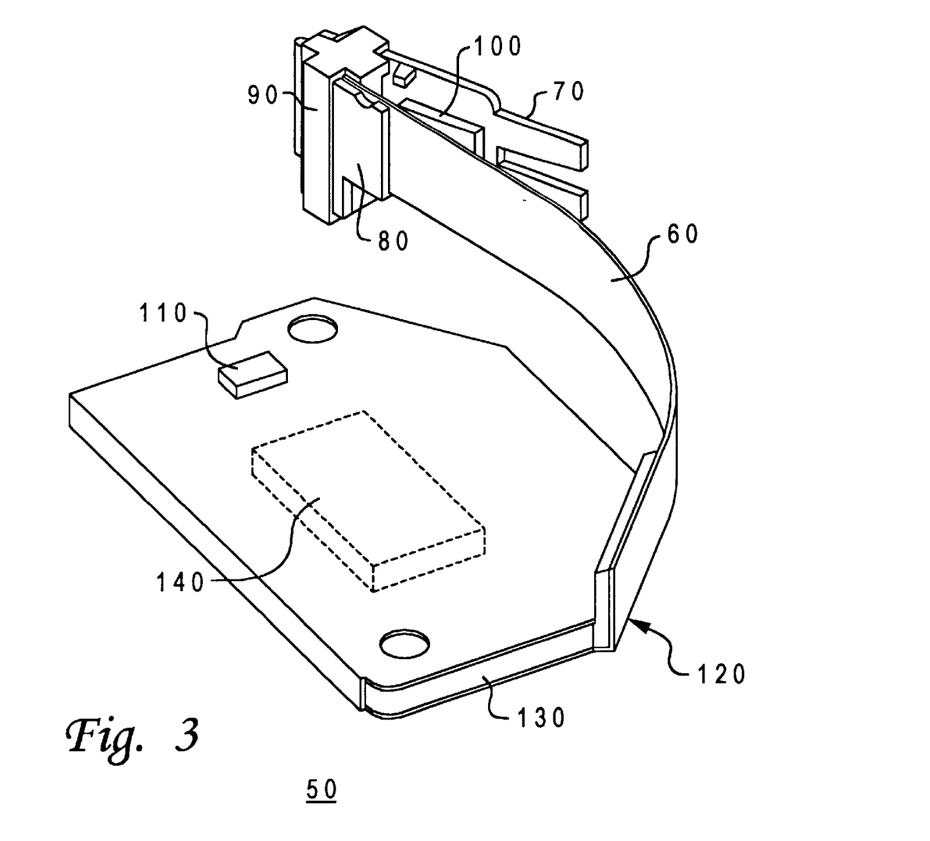
FIG. 3 is a perspective view of a flex cable assembly (FCA) 50.

FIG. 3 is a perspective view of the flex cable assembly (FCA) 50. The flex cable assembly (FCA) 50 includes a flexible cable 60, a first bracket 70, a second bracket 80, a bracket band (hereinafter referred to as simply a "band") 90, arm electronics (AE) 100, other electrical parts 110, a vertical bracket 120, a base bracket 130, and a connector 140. There are cases where the flex cable assembly (FCA) 50 does not include the band 90 before the band 90 is mounted.

Figure 4:
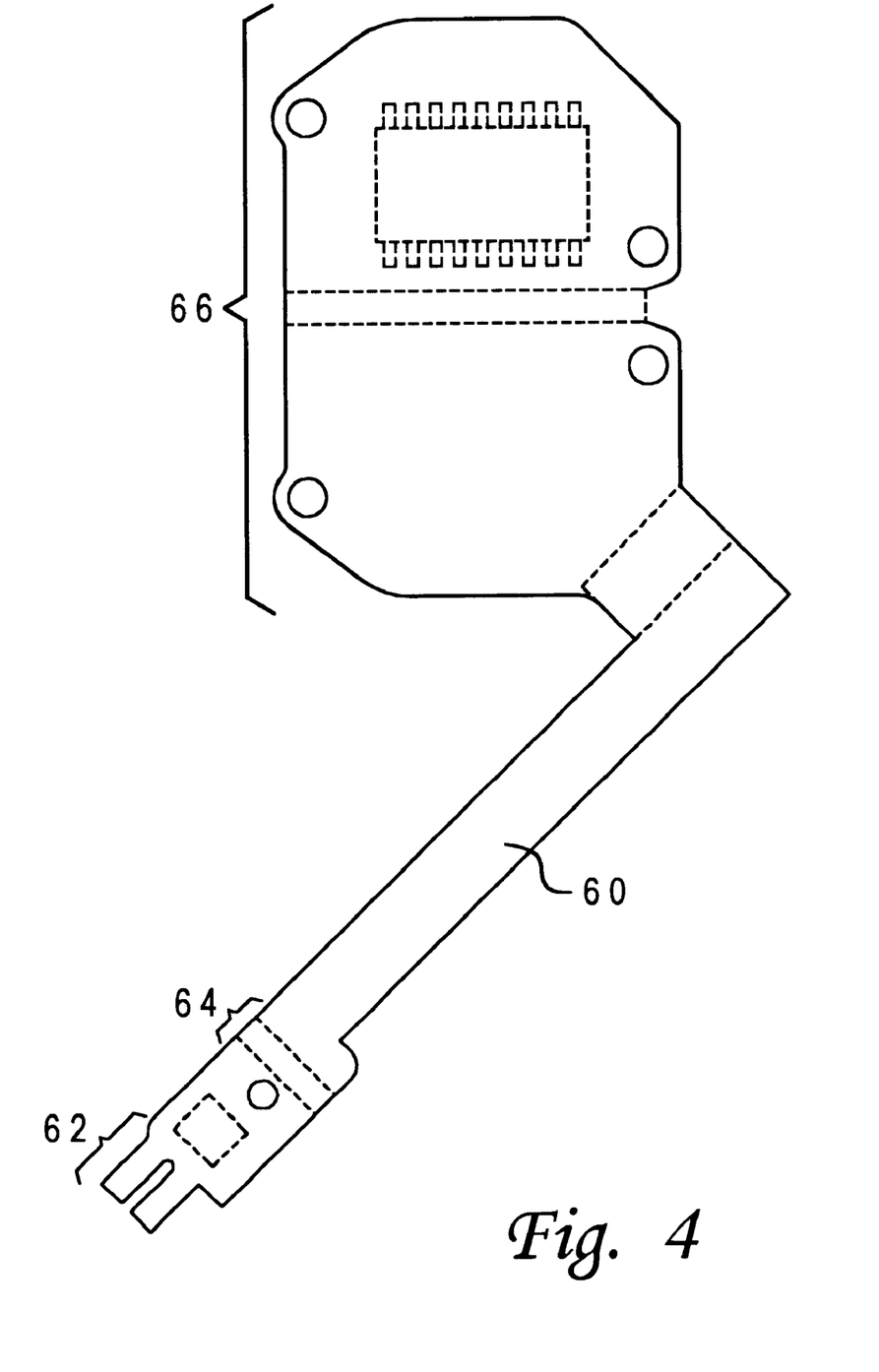
FIG. 4 is a plan view of a flexible cable 60.

FIG. 4 is a plan view of the flexible cable 60. The whole flexible cable 60 can be cut into a sheet, which can include a wiring pattern therein. One end 62 of the flexible cable 60 is connected to both the head gimbal assembly (HGA) 32 and the coil support 38, while the other end 66 is mounted on the base 12 (FIG. 1). The flexible cable 60 can be folded back to a mountain side or a valley side at positions indicated by dotted lines. That is, the flexible cable 60 can also be folded back between positions at which the first bracket 70 and the second bracket 80 will be attached, indicated by 64.

Figure 5:
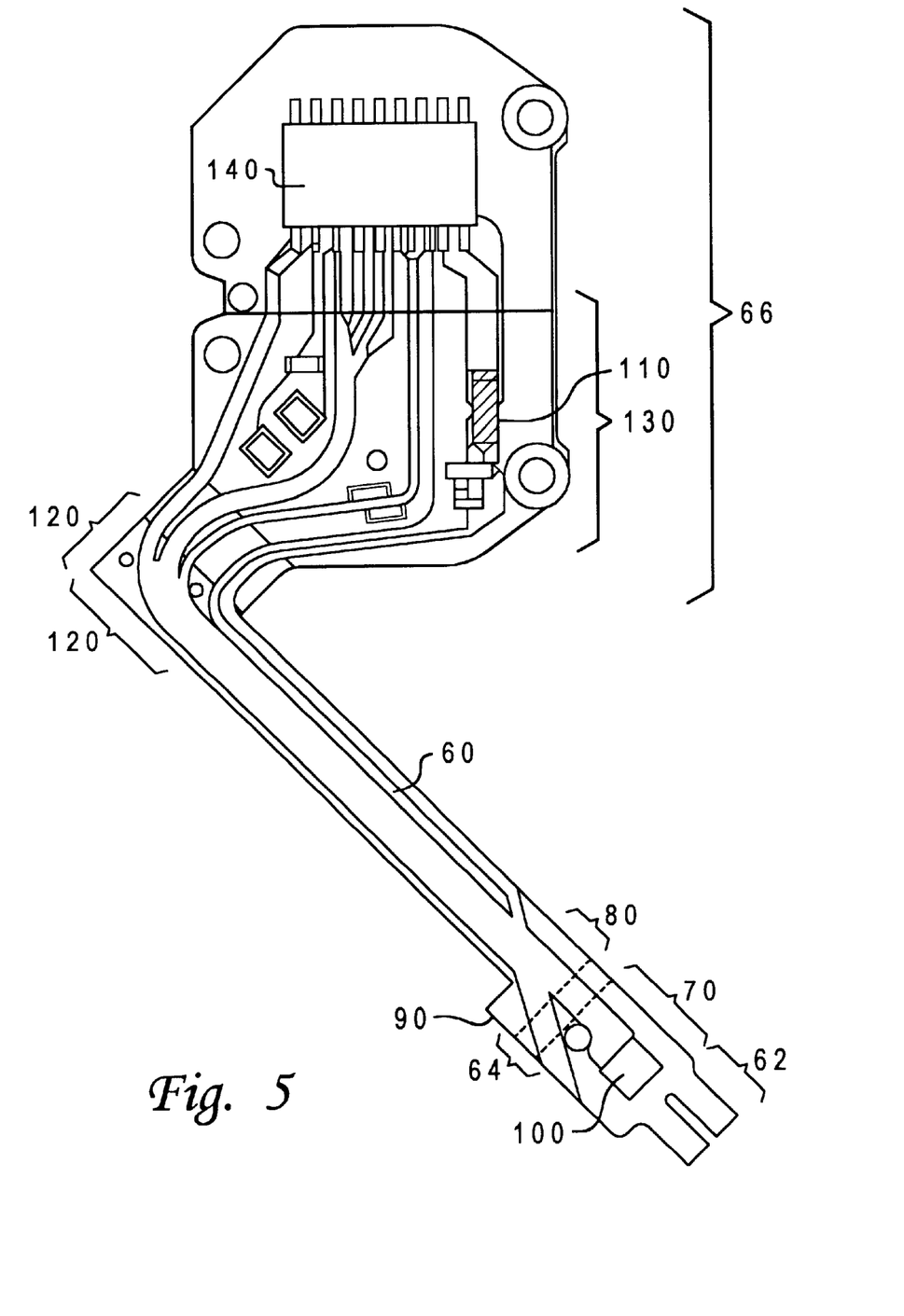
FIG. 5 is a plan view of the flex cable assembly (FCA) 50.

FIG. 5 is a plan view of the flex cable assembly (FCA) 50. The first bracket 70, second bracket 80, band 90, AE 100, other electrical parts 110, vertical bracket 120, base bracket 130, and connector 140 are attached to the flexible cable 60 that has been cut out into a sheet shape over its whole. Note that in order to attach these components to the flexible cable 60, it is easy for those having skill in this field to adopt various methods, such as adhesion, welding, and soldering.

The FCA 50 can be assembled three-dimensionally as shown in FIG. 3, by folding back it to a mountain side or a valley side at positions indicated by dotted lines in FIG. 4. As a result of assembly, the connector 140 attached to the other end 66 of the flexible cable 60 is moved to a plane (indicated by a dotted line in FIG. 3) opposite from the plane shown in FIG. 4 or 5. Also, the flexible cable 60 can be assembled perpendicular to the base bracket 130, by assembling the vertical bracket 120 perpendicularly with respect to the base bracket 130 (FIG. 3).

Figure 6:
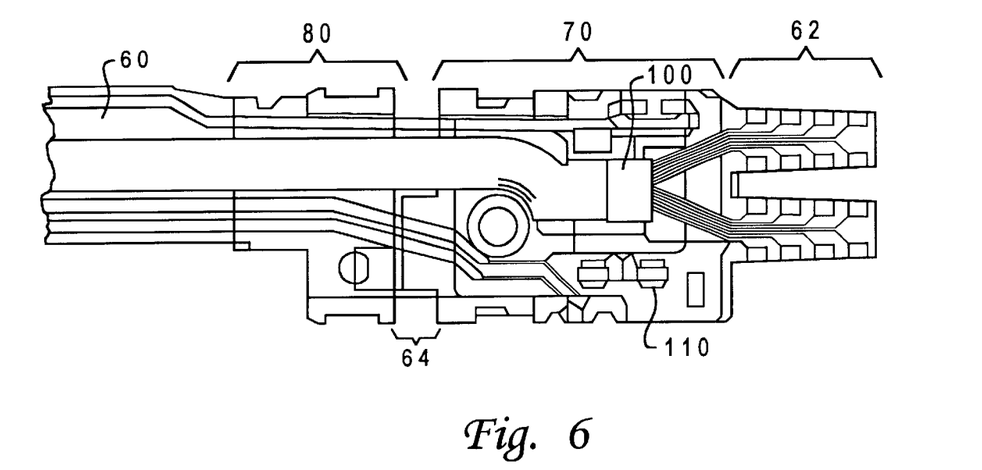
FIG. 6 is an enlarged plan view of part of the flex cable assembly (FCA) before folding back a flexible cable 60.

FIG. 6 is an enlarged plan view of part of the flex cable assembly (FCA) 50 before folding back the flexible cable 60. As shown in this figure, the first bracket 70 and the second bracket 80 are separated through the flexible cable 60, so that the portion 64 between the first bracket 70 and the second bracket 80 can be folded back.

Figure 7:
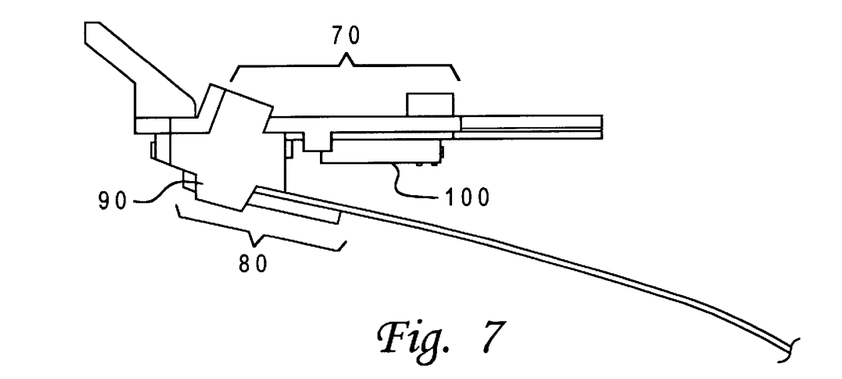
FIG. 7 is an enlarged top view of part of the flex cable assembly (FCA) after folding back the flexible cable 60.

FIG. 7 is an enlarged top view of part of the flex cable assembly (FCA) 50 after folding back the flexible cable 60. According to this figure, it can be seen that the first bracket 70 and the second bracket 80 overlap each other with the flexible cable 60 folded back. The first bracket 70 and the second bracket 80 are held because the band 90 is interposed therebetween.

Also, since the band 90 is interposed between the first bracket 70 and the second bracket 80, the second bracket 80 and the flexible cable 60 attached thereto are spaced from the AE 100. Furthermore, the first bracket and the second bracket 80 are held while maintaining a predetermined angle formed therebetween.

The reason why such a configuration becomes necessary is related to the fact that the AE 100 and the other electrical parts 110 are provided near the head suspension assembly (HSA) 30. Disposing electrical parts at a position as near as possible with respect to the head 34 is advantageous in function. For instance, there are cases where only a weak current can be taken out from the head 34, so it is advantageous to apply current to a preamplifier circuit within the AE 100 in an early stage. In practice, the AE 100 and the other electrical parts 110 occupy a considerable area on the first bracket 70.

Figure 8:
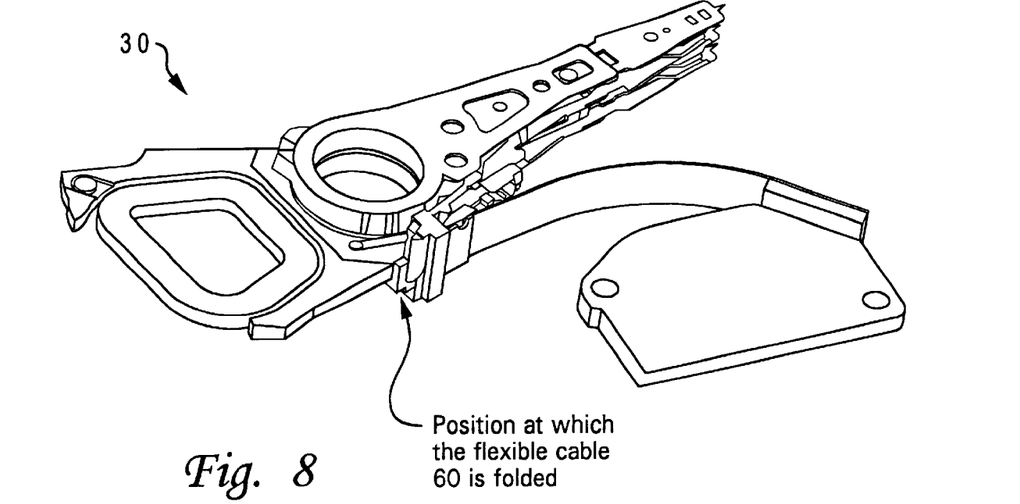
FIG. 8 is a perspective view of the head suspension assembly (HSA) 30.

FIG. 8 is a perspective view of the head suspension assembly (HSA) 30 and is also an enlarged view showing one of the perspectives of FIG. 2. From FIG. 8, both a position at which the flex cable assembly (FCA) 50 is attached to the head gimbal assembly (HGA) 32 and the coil support 38 and a position at which the flexible cable 60 is folded back are understood.

Figure 9:
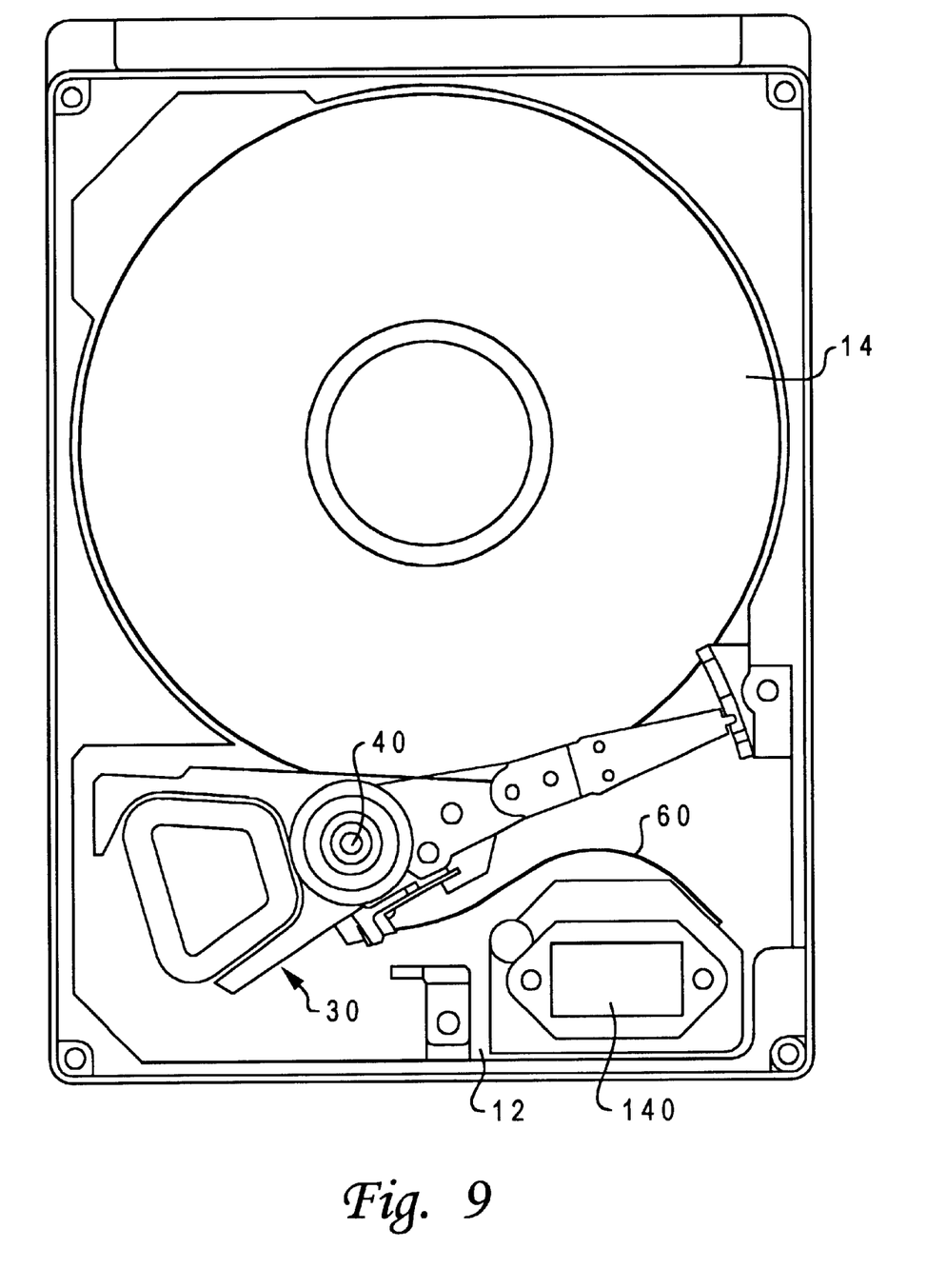
FIG. 9 is a plan view showing the head suspension assembly (HSA) 30 in the hard disk drive (HDD) 10.

FIG. 9 is a plan view showing the relationship that the head suspension assembly (HSA) 30 is disposed within the hard disk drive (HDD) 10. The flexible cable 60 is in the shape of S. The head suspension assembly (HSA) 30 has not had access to a desired position on the disk 14 (when the head suspension assembly (HSA) 30 is at a desired position on the disk 14, it is in a so-called loaded state). That is, the head suspension assembly (HSA) 30 is at an unloaded position (or in a so-called unloaded state). It can be understood that the S shape of the flexible cable 60 is deeply related to the fact that the first bracket 70 and the second bracket 80 are held while maintaining a predetermined angle formed therebetween.

If the head suspension assembly (HSA) 30 has access to a desired position on the disk 14, the radius of curvature of the arc drawn as letter S will vary correspondingly. That is, the flexible cable 60 produces a variable bias force. This bias force produces a force having influence on the rotation of the head suspension assembly (HSA) 30 about the shaft 40, namely, moment of rotation. If such moment of rotation changes largely, there is a possibility that, when the head suspension assembly (HSA) 30 has access to a predetermined position on the disk 14, it will cause an erroneous operation to occur. Therefore, in order to ensure the data access reliability of the HDD, a less change in the moment of rotation is desirable.

For this reason, careful consideration must be given to the attachment position of the HSA to the base, the access range of the HSA, and the seek angle (angle of rotation) between the shaft 40, which is the center of attachment of the HSA, and the disk 14, when they are designed. That is, in consideration of them, 15 degrees, which is the angle between the first bracket and the second bracket, has been determined. Note that it is easy for those skilled in the art to adopt various angles between the first bracket 70 and the second bracket 80 in other various HDDs.

It is understood that in order to utilize the space within the HDD 10 efficiently, the flexible cable 60 has to be folded back at the position where it is attached to the HGA 30. If the flexible cable 60 is folded back as shown in FIG. 9, the flexible cable 60 will have substantially the same effect as the flexible cable 60 is attached at a position as near as possible with respect to the shaft 40 that is the center of rotation of the head suspension assembly (HSA) 30. That is, the arm length to the root of the flexible cable 60 producing moment of rotation is shortened, whereby the moment of rotation can be suppressed to a small value. Also, if the S-shaped portion formed by the flexible cable 60 is lengthened, a change in the radius of curvature can be made relatively small.

Here, the reason that, as shown in FIG. 6, the flex cable assembly (FCA) 50 is provided with the first bracket 70 and the second bracket 80 will be set forth. Although also evident in the fact that the flexible cable 60 can be folded back at the portion 64 between the first bracket 70 and the second bracket 80, it cannot be the that the flexible cable 60 alone has sufficient rigidity with respect to bending. Rigidity is also necessary for fixing the flexible cable 60 to other components. Hence, if the first bracket 70 and the second bracket 80 are provided, at least the portions provided with these brackets will ensure rigidity.

Figure 10A:
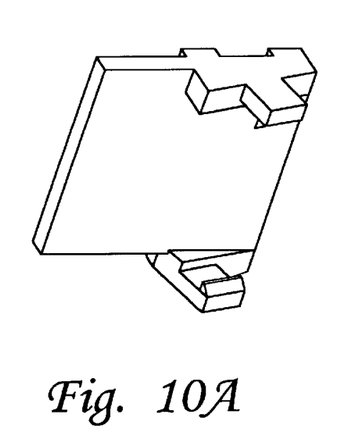
FIG. 10 is a perspective view showing the case of causing a second bracket 80 to have hooked portions as supposition.
Figure 10B:
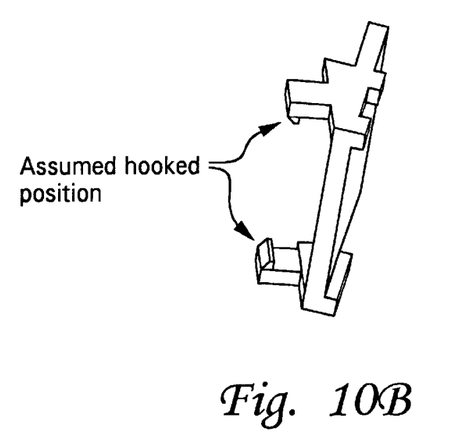

The first bracket 70 and the second bracket 80 are held with the brackets engaging each other, while they need to be easily mounted from the standpoint of manufacturing and easily detached from the standpoint of disassembly. In order to meet both the mounting function and the detaching function, it is considered that the second bracket 80 is provided with hooked portions, as assumed in FIGS. 10A–B, for example.

However, if the second bracket 80 is provided with hooked portions, the second bracket 80 will not be in flat shape. Considering the convenience of the manufacturing that the second bracket 80 is attached to the cable 60 by adhesion, it is desirable that the second bracket 80 be as flat as possible. It is desirable to remove a protruding portion from the second bracket 80, such as the hooked portion assumed in FIGS. 10A–B, as much as possible. It is assumed that the first bracket is provided with hooked portions and handled as a flat shape.

It is also desirable that the first bracket 70 be in flat shape. The reason is that electrical parts, such as AE 100 or the like, are mounted on the first bracket 70. More specifically, access operation, such as soldering or the like, becomes necessary for the electrical connection between the one end 62 of the flex cable assembly (FCA) 50 and the head gimbal assembly (HGA) 32 (see an arrow in FIG. 11). In performing such access operation, a protruding portion such as a hooked portion is physically a hindrance and is therefore undesirable.

Also, there are cases where either the hook shape of the first bracket 70 or the hook shape of the second bracket 80 is damaged by forcible attachment or detachment. In such a case, not only either of the first and second brackets 70, 80 but the flexible cable 60 to which they are attached, namely, the entire flex cable assembly (FCA) 50 has to be exchanged.

Figure 11:
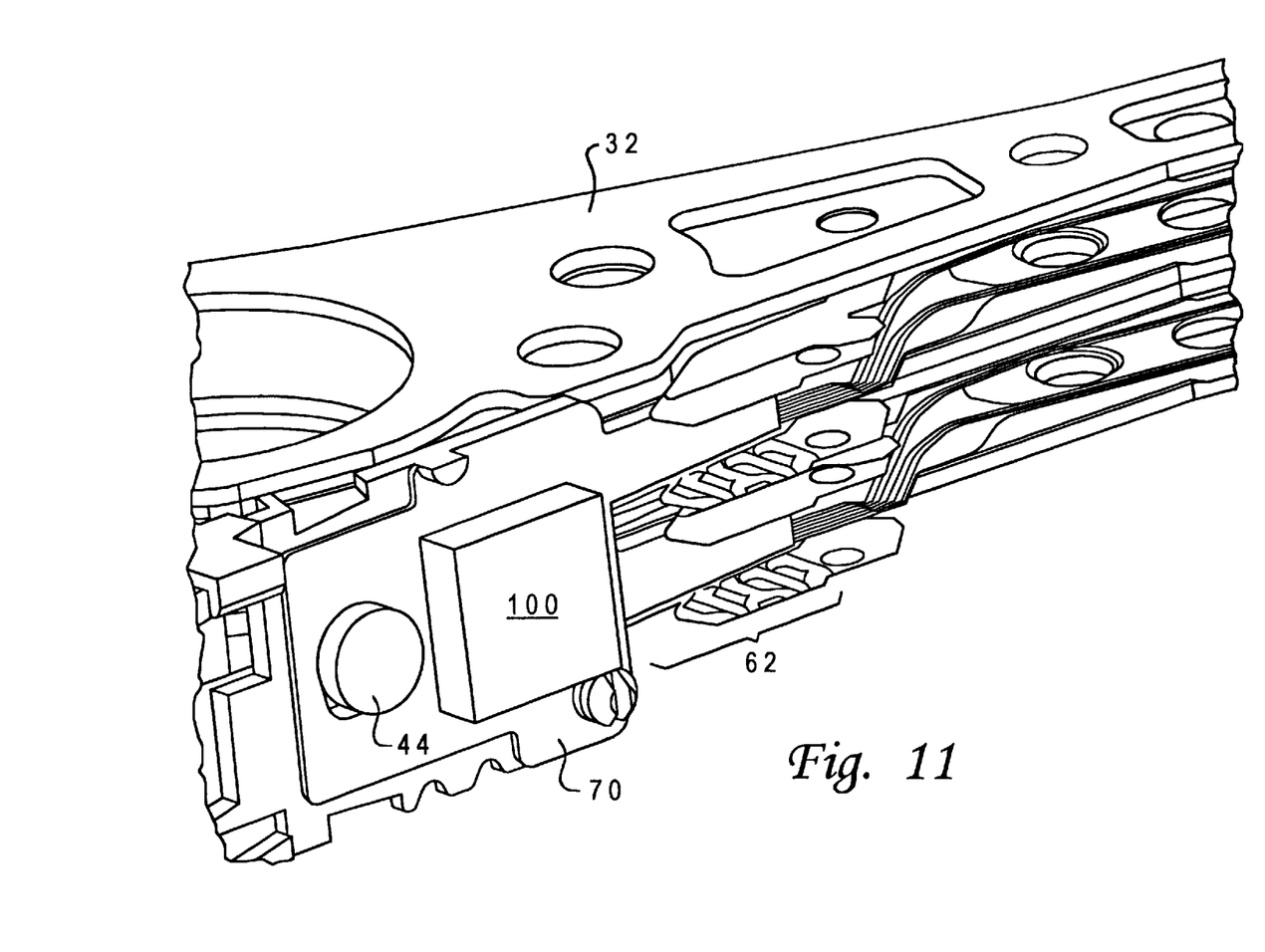
FIG. 11 is an enlarged perspective view illustrating the need to attach flex cable assembly (FCA) 50 to head gimbal assembly (HGA) 32 with attaching screw 44 before folding back flexible cable 60.
Figure 12A:
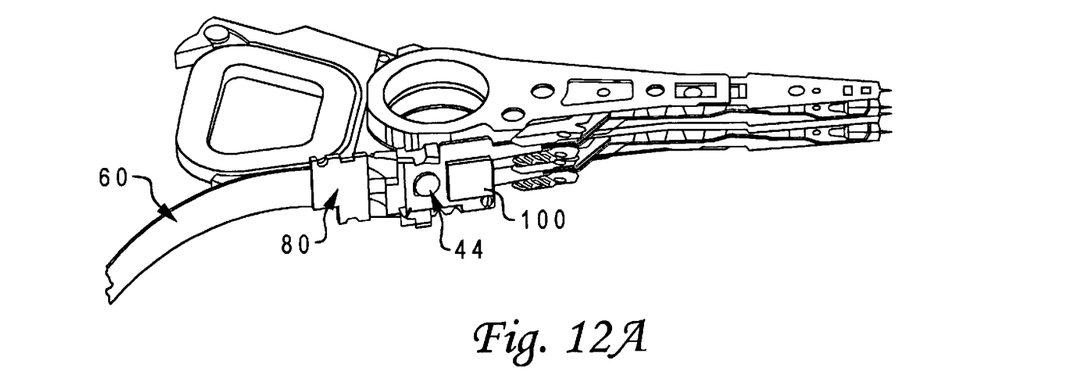
Figure 12B:
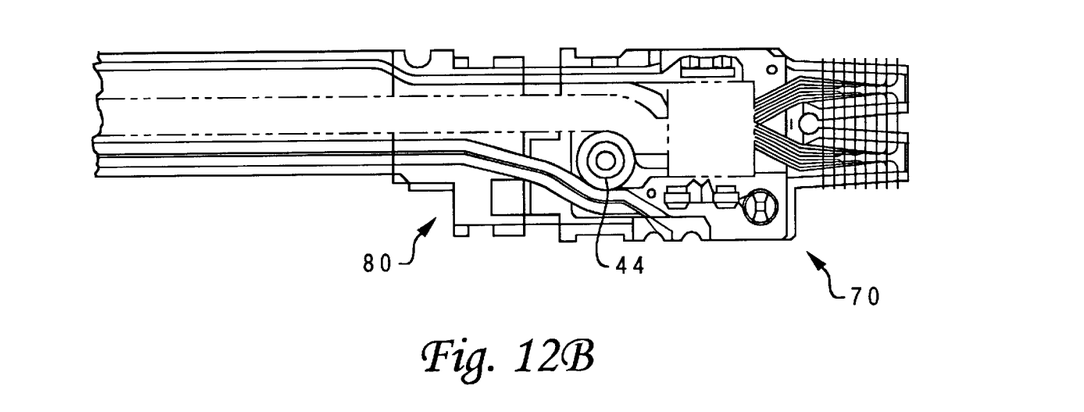

As shown in FIGS. 11 and 12A–B, there is a need to attach the flex cable assembly (FCA) 50 to the head gimbal assembly (HGA) 32 by means of an attaching screw 44 before folding back the flexible cable 60. The threaded portion of the attaching screw 44 projects from the first bracket 70. The threaded portion of the attaching screw 44 is spatially avoided because of the existence of the band 90, as in the description of FIG. 7. A portion fulfilling such a function is called the support portion of the band 90, a detailed description thereof being made later.

Figure 13:
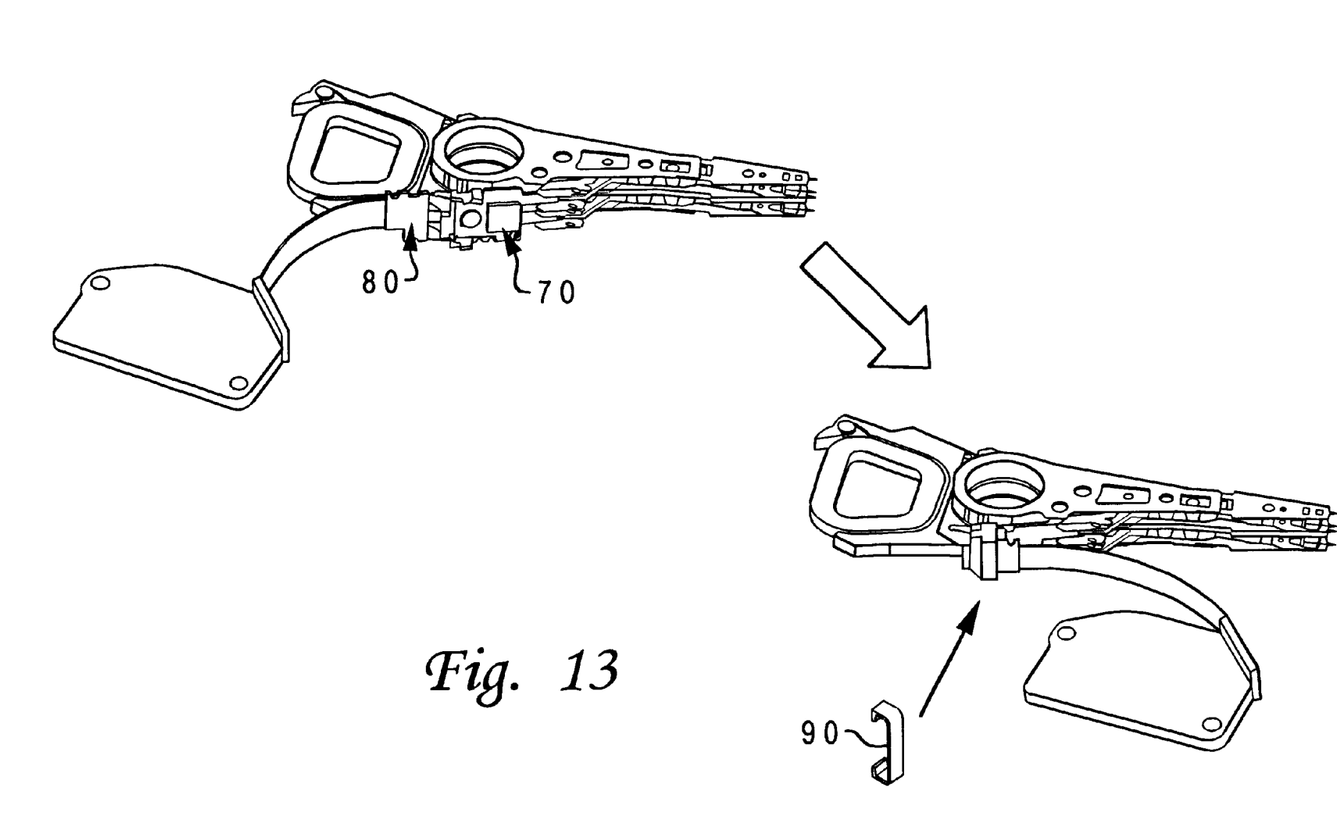
FIG. 13 is a perspective view showing that a band 90 is utilized separately from the first bracket 70 and second bracket 80.

As shown in FIG. 13, the present invention is provided with the band 90 as a component separate from the first and second brackets 70, 80. Using this band 90, the band 90 is mounted while the first bracket 70 and the second bracket 80 are being overlapped with each other, whereby the first bracket 70 and the second bracket 80 can be held. Since the band 90 is employed as a separate component, attachment is easy and detachment is also easy. Although, in FIG. 13, the band 90 is drawn as a component separate from the second bracket 80, the band 90 and the second bracket 80 can be held as one body, as described infra.

A description will next be made of which manufacturing stage the attachment or detachment of the band 90 should be performed at. This operation may be performed at the stage of forming the flex cable assembly (FCA) 50 (FIG. 3). It may also be performed at the stage of forming the head suspension assembly (HSA) 30 (FIGS. 2, 8 and 13). Furthermore, it may be performed at the stage of finally assembling the head suspension assembly (HSA) 30 into the base 12 of the hard disk drive (HDD) 10 (FIGS. 1 and 9).

For instance, consider the stage of finally assembling the head suspension assembly (HSA) 30 into the base 12 of the hard disk drive (HDD) 10. Attaching the other end 66 of the flexible cable 60 to the base 12 through the connector 140 has previously been set forth. At this time, the connector 140 is on the back side, as shown in FIG. 3, so that the connection of the connector 140 to the base 12 and the detachment of the connector 140 from the base 12 are extremely easy and can be performed even before band attachment or even after band attachment, namely, at any stage. That is, attachment of the band 90 is realizable in the unit of head suspension assembly (HSA) 30 or in the unit of the entire hard disk drive (HDD) assembly.

Figure 14A:
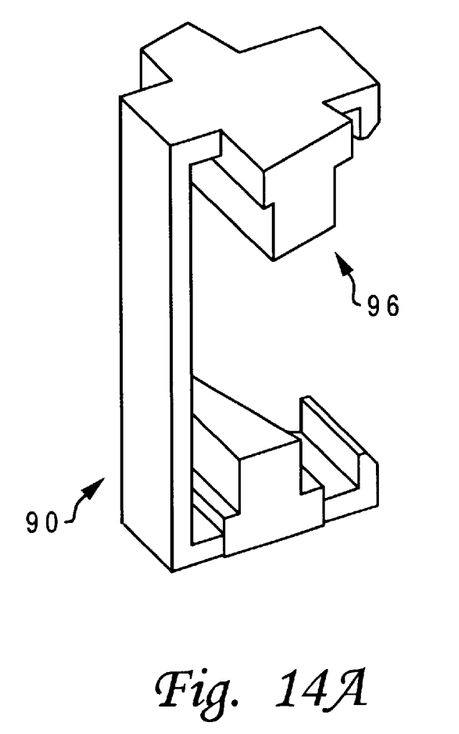
FIG. 14, which includes a perspective view and a plan view, illustrates that band 90 can be provided with both hooked portions 92 and support portions 96.
Figure 14B:
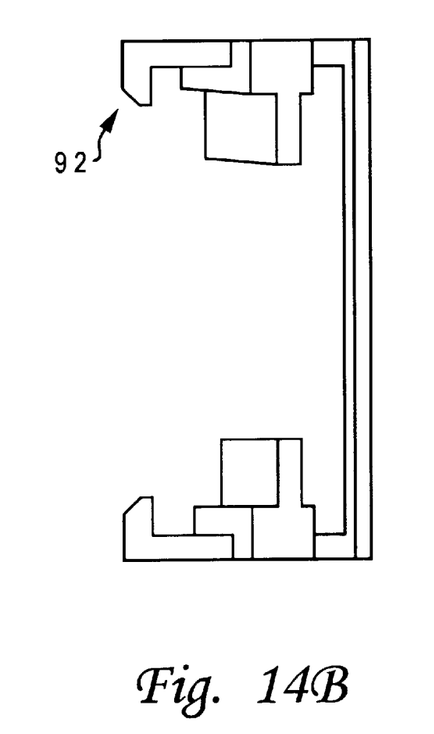
Figure 15:
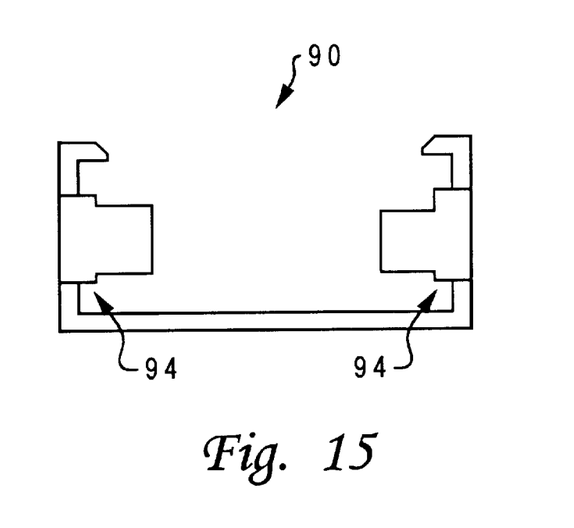
FIG. 15 is a plan view showing grooves 94 formed in the band 90.
Figure 16:
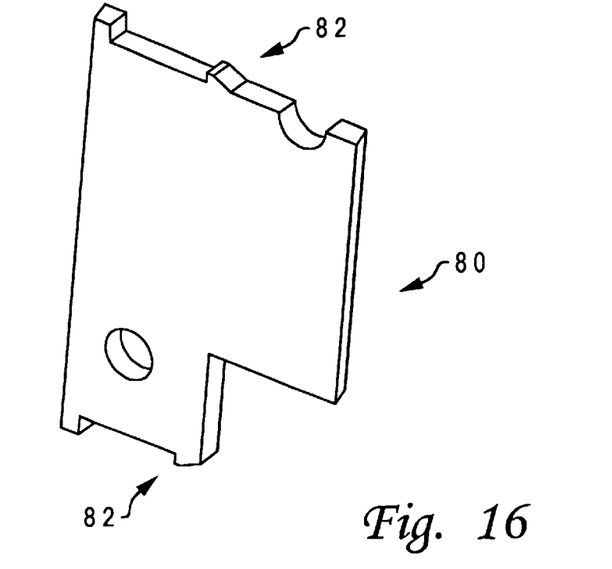
FIG. 16 is a perspective view showing protrusions provided on the second bracket side.

As shown in FIGS. 14A–B, the band 90 can also be provided with both a hooked portion 92 and a support portion 96. The hooked portion 92 is a portion engageable with the first bracket 70. If the support portion 96 is formed to have a certain angle, as shown in FIG. 14, the second bracket 80 and the flexible cable 60 attached thereto can spatially avoid the attaching screw 44 and the AE 100. The first bracket 70 and the second bracket 80 are held while maintaining about an angle of 15° formed therebetween, which is a predetermined angle. When the band 90 does not engage the first bracket 70, the band 90 and the second bracket 80 can be held as one body by the engagement between the grooves 94 of the band 90 and the protrusions 82 provided on the side of the second bracket 80. If done in this manner, there is no need to archive only the band 90 as a separate component.

Figure 17A:
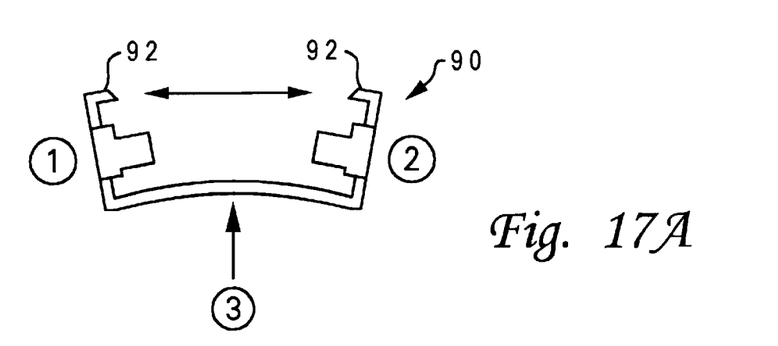
FIG. 17 is a schematic diagram comparing the case where only band 90 is bent (FIG. 17A), and the case where band 90 is bent while attached to flexible cable 60 (FIG. 17B).
Figure 17B:
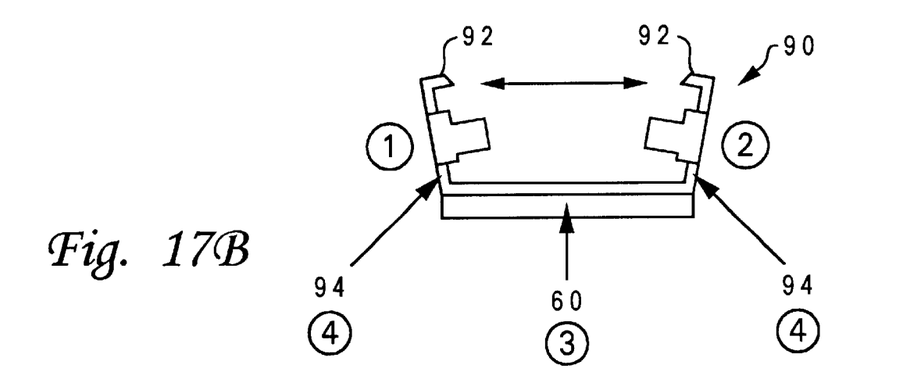

FIGS. 17A–B is a schematic diagram comparing the case where the band 90 alone is bent (FIG. 17A) and the case where the band 90 is bent with the band 90 attached to the flexible cable 60 (FIG. 17B). For example, if at least a portion of the band 90 is made of elastically deformable material, that portion will be bent. As a result, the hooked portions 92 of the band 90 are widened and clamp the first bracket 70, whereby engagement becomes possible. Of course, it is easy for those having skill in this field to adopt other various methods of engagement.

However, from FIGS. 17A–B it follows that the case in FIG. 17A is more advantageous in bending than that in FIG. 17B. The reason is that bending is not restricted by the flexible cable 60. That is, in the case of FIG. 17B, the bending rigidity of the flexible cable 60 increases excessively. Also, in the case of FIG. 17A, the hooked portions 92 can be provided lengthwise, so they can firmly engage (or clamp) the first bracket 70. Even if there were a great vibration or shock, disengagement would be difficult. On the other hand, in the case of FIG. 17B there is even a possibility of damaging the grooves 94. The case of FIG. 17B is also considered equivalent to the case (FIGS. 10A–B) where hooked portions are provided on the side of the second bracket as supposition. The reason is that bending rigidity increases excessively by the amount that the second bracket 80 has a wider width than the band.

The first bracket 70, the second bracket 80, and the band 90 employ plastic material. The reason is that the plastic material can be formed into a complicated shape; the plastic material is light in weight and also has elasticity; and the plastic material is suitable for mass production. ULTEM (trademark of GE. Plastic Co.) consisting of polyether imide (PEI) was employed as a suitable material. More particularly, a grade of ULTEM1000 was used. If it is desirable to change the coefficient of elasticity, those having skill in this field may adopt other grades.

In the reasons why the aforementioned material was used, heat-resisting property has also been taken into consideration. The reason is that the attachment of the AE 100 and the other electrical parts 110 to the first bracket 70 of the flex cable assembly (FCA) 50 and the attachment of the flexible cable 60 to head gimbal assembly (HGA) 32 are performed by soldering. Furthermore, if the materials for the first bracket 70, the second bracket 80, and the band 90 are all the same, they will fit each other, because they engage and physically contact.

In order for the band to obtain sufficient elasticity, it is considered that the thinnest possible band 90 is better. However, in practical production, if the thickness is less than 0.3 mm, resin will not easily flow into a metal mold and therefore stable products cannot be made. On the other hand, it has been confirmed that even a thickness of 0.3 mm fulfills a sufficient function.

It should be apparent to those skilled in the art to adopt other substitute plastic materials and other proper thickness with respect to the band.

What is claimed is:

1. A flex cable assembly, comprising:
   a flexible cable;
   a first bracket that is attached to said flexible cable;
   a second bracket that is attached to said flexible cable and spaced apart from the first bracket along a length of said flexible cable; and
   a band for holding said first and second brackets in a state wherein said flexible cable is folded back and said first and second brackets overlap each other, said band being attachable to and detachable from said first and second brackets.

2. The flex cable assembly as set forth in claim 1, wherein at least a portion of said band is made of elastically deformable material, said band being provided with a hooked portion that is engageable with said first bracket.

3. The flex cable assembly as set forth in claim 1, wherein said band is provided with a support portion for supporting said first and second brackets while maintaining a predetermined angle formed therebetween.

4. The flex cable assembly as set forth in claim 3, wherein said first and second brackets are supported by the support portion while being maintained an angle of 15° therebetween.

5. A flex cable assembly, comprising:
   a flexible cable;
   a first bracket that is attached to said flexible cable;
   a second bracket that is attached to said flexible cable;
   a band for holding said first and second brackets in a state wherein said flexible cable is folded back and said first and second brackets overlap each other, said band being attachable to and detachable from said first and second brackets; and wherein
   said band is provided with a groove and said second bracket is provided with a protrusion, and wherein, even when said band is in a disengaged state with the first bracket, said band and said second bracket are held as one body by engagement between said groove in said band and said protrusion provided in said second bracket.

6. A head suspension assembly, comprising:
   a flex cable assembly having a flexible cable, first and second brackets attached to said flexible cable and spaced apart from each other along a length of said flexible cable such that a portion of the length of said flexible cable is located between the first and second brackets, and a band for holding said first and second brackets in a state wherein said flexible cable is folded back and said first and second brackets overlap each other, said band being attachable to and detachable from said first and second brackets; and
   a head gimbal assembly wherein one end of the flex cable assembly is attached to said head gimbal assembly.

7. The head suspension assembly as set forth in claim 6, wherein at least a portion of said band is made of elastically deformable material, said band being provided with a hooked portion that is engageable with said first bracket.

8. The head suspension assembly as set forth in claim 6, wherein said band is provided with a support portion for supporting said first and second brackets while maintaining a predetermined angle formed therebetween.

9. The head suspension assembly as set forth in claim 8, wherein said first and second brackets are supported by the support portion while being maintained an angle of 15° therebetween.

10. A head suspension assembly, comprising:
    a flex cable assembly having a flexible cable, first and second brackets attached to said flexible cable, and a band for holding said first and second brackets in a state wherein said flexible cable is folded back and said first and second brackets overlap each other, said band being attachable to and detachable from said first and second brackets;
    a head gimbal assembly wherein one end of the flex cable assembly is attached to said head gimbal assembly; and wherein
    said band is provided with a groove and said second bracket is provided with a protrusion, and wherein, even when said band is in a disengaged state with the first bracket, said band and said second bracket are held as one body by engagement between said groove in said band and said protrusion provided in said second bracket.

11. A hard disk drive, comprising:
    a base;
    a head suspension assembly rotatably attached to said base, the head suspension assembly having a head gimbal assembly;
    a flex cable assembly having a flexible cable, first and second brackets attached to said flexible cable and spaced apart from each other along a length of said flexible cable such that a portion of the length of said flexible cable is located between the first and second brackets, and a band for holding said first and second brackets in a state wherein said flexible cable is folded back and said first and second brackets overlap each other, said band being attachable to and detachable from said first and second brackets, wherein one end of the flex cable assembly is attached to said head gimbal assembly, and an opposite end of the flex cable assembly is connected to said base.

12. The hard disk drive as set forth in claim 11, wherein at least a portion of said band is made of elastically deformable material, said band being provided with a hooked portion that is engageable with said first bracket.

13. The hard disk drive as set forth in claim 11, wherein said band is provided with a support portion for supporting said first and second brackets while maintaining a predetermined angle formed therebetween.

14. The hard disk drive as set forth in claim 13, wherein said first and second brackets are supported by the support portion while being maintained an angle of 15° therebetween.

15. A hard disk drive, comprising:
    a base;
    a head suspension assembly rotatably attached to said base, the head suspension assembly having a head gimbal assembly;
    a flex cable assembly having a flexible cable, first and second brackets attached to said flexible cable, and a band for holding said first and second brackets in a state wherein said flexible cable is folded back and said first and second brackets overlap each other, said band being attachable to and detachable from said first and second brackets, wherein one end of the flex cable assembly is attached to said head gimbal assembly, and an opposite end of the flex cable assembly is connected to said base; and wherein
    said band is provided with a groove and said second bracket is provided with a protrusion, and wherein, even when said band is in a disengaged state with the first bracket, said band and said second bracket are held as one body by engagement between said groove in said band and said protrusion provided in said second bracket.

* * * * *